(12) United States Patent
Sachdev et al.

(10) Patent No.: US 11,642,712 B1
(45) Date of Patent: May 9, 2023

(54) METHOD OF MANUFACTURING VEHICLE BODY STRUCTURE COMPONENT TO INCLUDE REINFORCED REGIONS

(71) Applicant: GM GLOBAL TECHNOLOGY OPERATIONS LLC, Detroit, MI (US)

(72) Inventors: Anil K. Sachdev, Rochester Hills, MI (US); Louis G. Hector, Jr., Shelby Township, MI (US); Arianna T. Morales, Bloomfield Hills, MI (US); Andrew Clay Bobel, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/679,254

(22) Filed: Feb. 24, 2022

(51) Int. Cl.
*B21C 23/08* (2006.01)
*B21D 53/88* (2006.01)
*B21C 37/06* (2006.01)
*B21C 37/15* (2006.01)
*B21C 35/02* (2006.01)

(52) U.S. Cl.
CPC ............ *B21C 23/085* (2013.01); *B21D 53/88* (2013.01); *B21C 35/026* (2013.01); *B21C 37/06* (2013.01); *B21C 37/158* (2013.01)

(58) Field of Classification Search
CPC ....... B21C 23/085; B21C 37/06; B21C 23/10; B21C 25/08; B21C 35/026
See application file for complete search history.

(56) References Cited

U.S. PATENT DOCUMENTS

| | | | | |
|---|---|---|---|---|
| 2,872,037 A | * | 2/1959 | Ausel | B21C 25/00 72/264 |
| 3,267,712 A | * | 8/1966 | Atkin | B21C 23/10 72/260 |
| 4,241,146 A | * | 12/1980 | Sivachenko | E01D 19/125 428/156 |
| 4,838,063 A | * | 6/1989 | Nishiyama | B21C 1/24 72/47 |
| 5,346,432 A | * | 9/1994 | Greulich | F16C 3/02 464/183 |
| 5,522,246 A | * | 6/1996 | Simon | B21C 37/16 74/567 |

(Continued)

FOREIGN PATENT DOCUMENTS

| | | | | |
|---|---|---|---|---|
| JP | 2018122318 A | * | 8/2018 | |
| JP | 6536624 B2 | * | 7/2019 | |
| KR | 20110053075 A | * | 5/2011 | B21C 37/08 |

OTHER PUBLICATIONS

KR20110053075A Machine Translation (Year: 2011).*
JP-2018122318-A machine translation (Year: 2018).*
JP-6536624-B2 machine translation (Year: 2019).*

*Primary Examiner* — Michael W Hotchkiss

(57) ABSTRACT

The present disclosure describes a method of manufacturing a vehicle body structure component. The method includes extruding a tube to include at least one reinforced region extending along a length of the tube. The tube has a first thickness in the at least one reinforced region and a second thickness in other regions of the tube. The first thickness is greater than the second thickness. The method further includes cutting a blank from the tube such that the blank includes at least a portion of the at least one reinforced region and forming the blank into a desired shape of the component.

20 Claims, 9 Drawing Sheets

(56) References Cited

U.S. PATENT DOCUMENTS

| | | | | |
|---|---|---|---|---|
| 5,545,488 | A * | 8/1996 | Burke | E04H 15/646 428/598 |
| 5,557,962 | A * | 9/1996 | Takikawa | B21C 35/02 72/260 |
| 5,881,595 | A * | 3/1999 | Sørensen | F28F 9/02 72/391.2 |
| 5,989,466 | A * | 11/1999 | Kato | B29C 48/09 264/40.5 |
| 6,070,448 | A * | 6/2000 | Eipper | B62D 21/00 72/363 |
| 8,202,625 | B2 * | 6/2012 | Sakae | B21C 23/085 428/568 |
| 8,245,734 | B2 * | 8/2012 | Jahani | B21C 37/16 138/155 |
| 9,033,398 | B2 * | 5/2015 | Verbrugge | B60R 19/18 428/34.1 |
| 9,085,323 | B2 * | 7/2015 | Busch | B62D 25/04 |
| 9,340,238 | B2 * | 5/2016 | Patsy, Jr. | B62D 29/008 |
| 9,421,592 | B2 * | 8/2016 | Jeong | B21B 1/22 |
| 9,533,343 | B2 * | 1/2017 | May | B21C 23/085 |
| 9,975,508 | B2 * | 5/2018 | Baldwin | B21C 35/026 |
| 10,357,817 | B2 * | 7/2019 | May | B21D 26/033 |
| 10,391,533 | B2 * | 8/2019 | Clausen | B21C 35/023 |
| 10,486,221 | B2 * | 11/2019 | Frost | B21D 35/006 |
| 10,596,611 | B2 * | 3/2020 | Nishimura | B21D 5/01 |
| 10,875,068 | B2 * | 12/2020 | Kavik | B21C 3/06 |
| 10,906,080 | B2 * | 2/2021 | Bishop | B21D 26/033 |
| 11,192,160 | B2 * | 12/2021 | Matsui | B21C 37/155 |
| 2003/0173800 | A1 * | 9/2003 | Langan | B62D 25/02 296/191 |
| 2006/0201227 | A1 * | 9/2006 | Lepre | B62D 21/11 72/370.14 |
| 2009/0169911 | A1 * | 7/2009 | Sakae | B21C 25/08 428/34.1 |
| 2009/0294112 | A1 * | 12/2009 | Reifel | F28F 1/40 165/182 |
| 2011/0070385 | A1 * | 3/2011 | Jahani | B60B 35/16 428/34.1 |
| 2011/0233961 | A1 * | 9/2011 | Verbrugge | B62D 29/008 428/34.1 |
| 2016/0288186 | A1 * | 10/2016 | Ito | B21D 11/08 |
| 2017/0072450 | A1 * | 3/2017 | May | B21D 53/88 |
| 2017/0209909 | A1 * | 7/2017 | Kavik | B21D 22/02 |
| 2018/0126435 | A1 * | 5/2018 | Egawa | B23P 15/00 |
| 2019/0030586 | A1 * | 1/2019 | Hodoya | B21D 53/88 |
| 2019/0275576 | A1 * | 9/2019 | Matsui | B21C 37/158 |
| 2019/0314882 | A1 * | 10/2019 | Bishop | G01B 11/12 |

\* cited by examiner

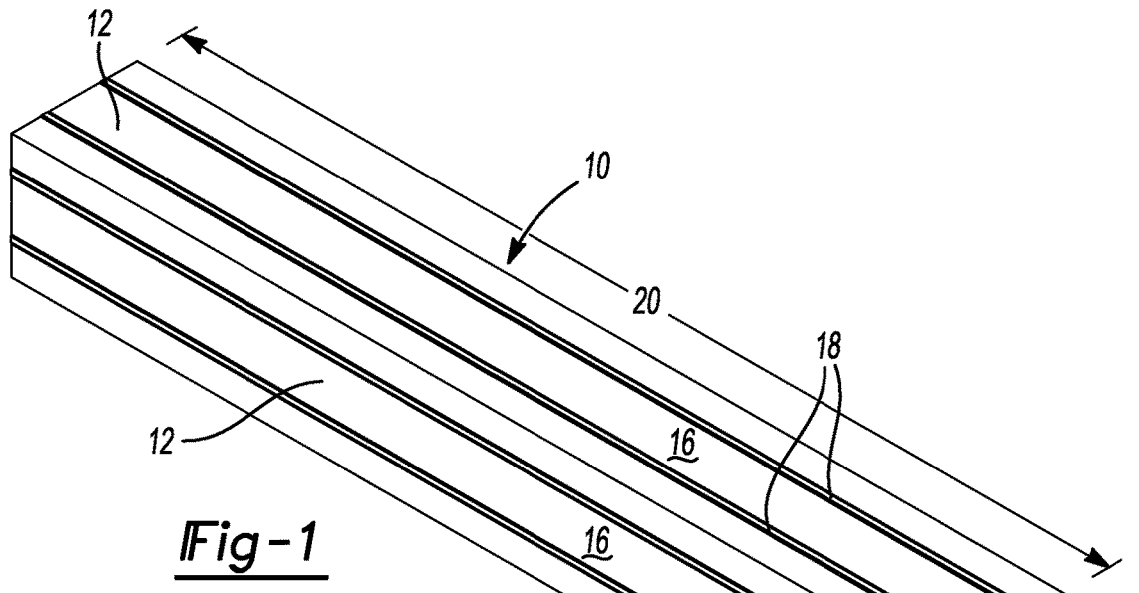
Fig-1
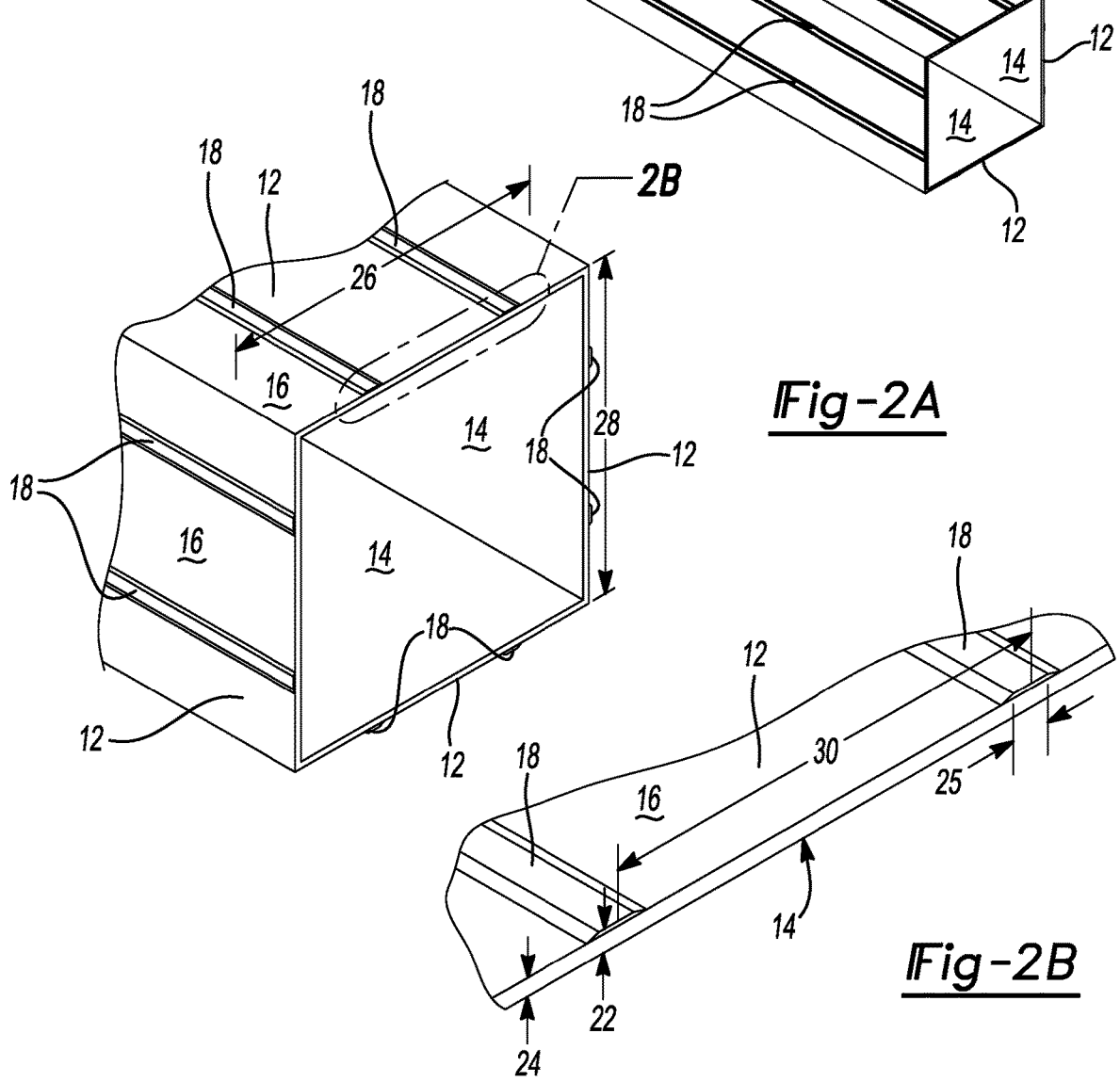
Fig-2A
Fig-2B

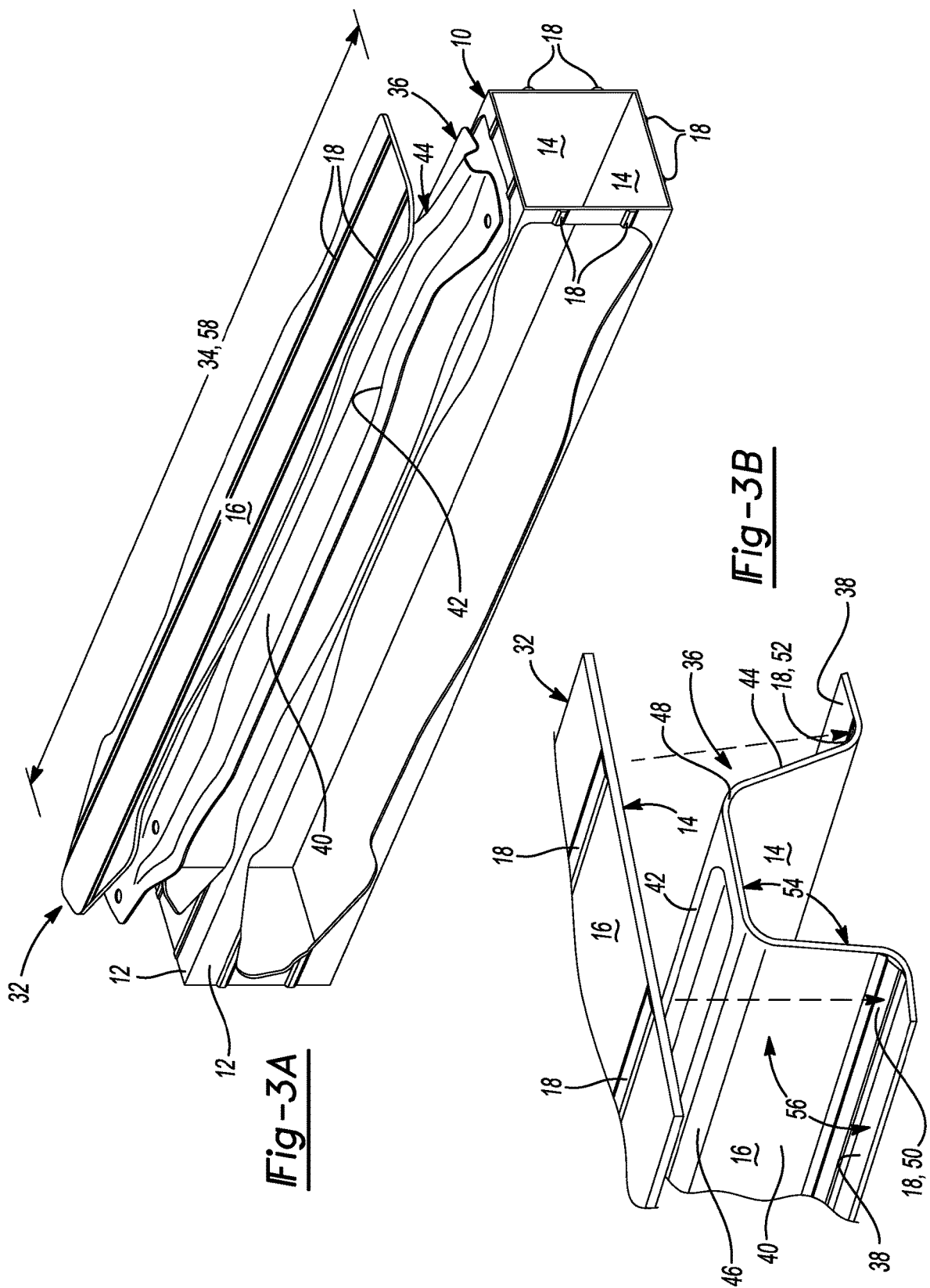

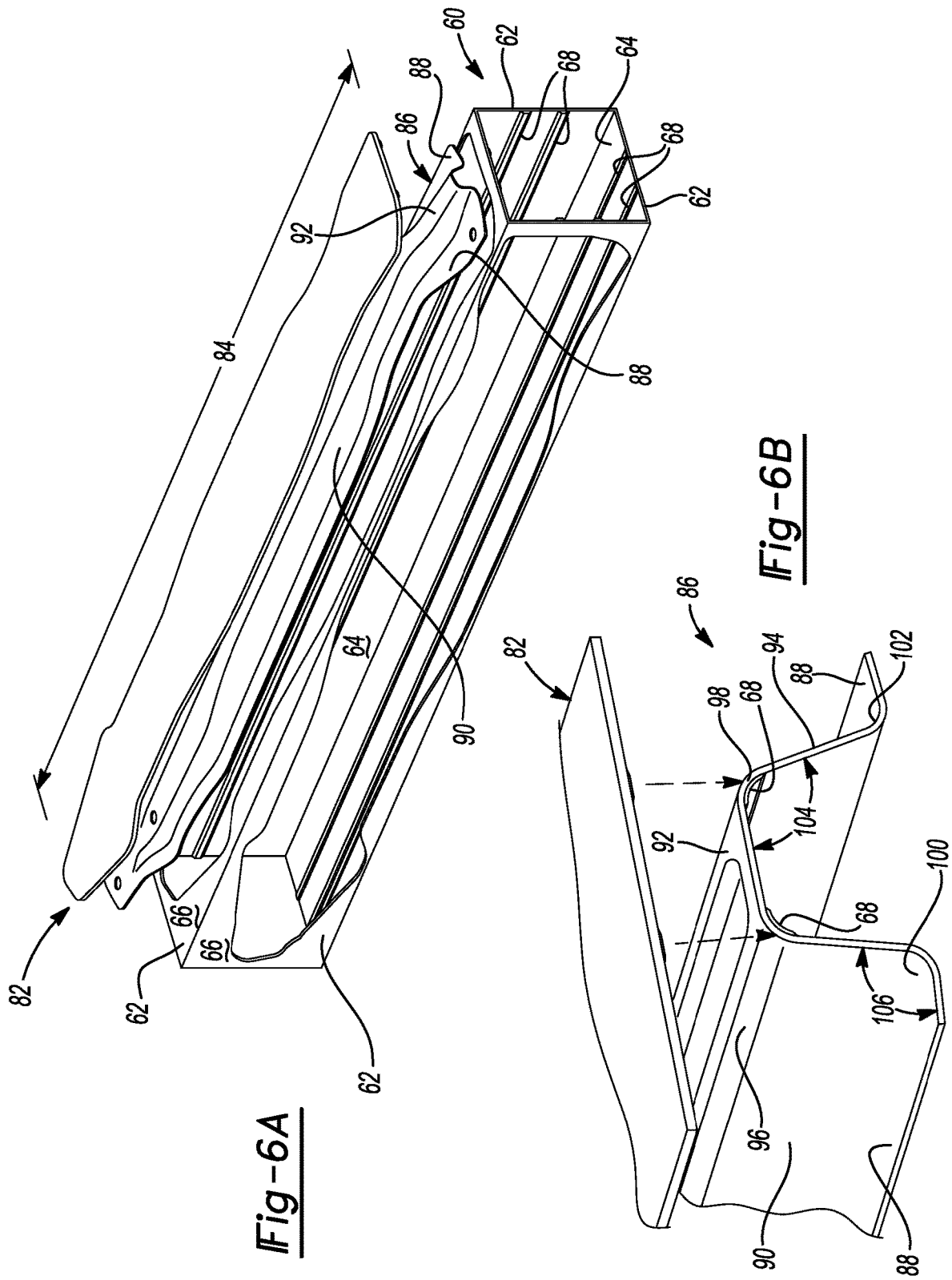

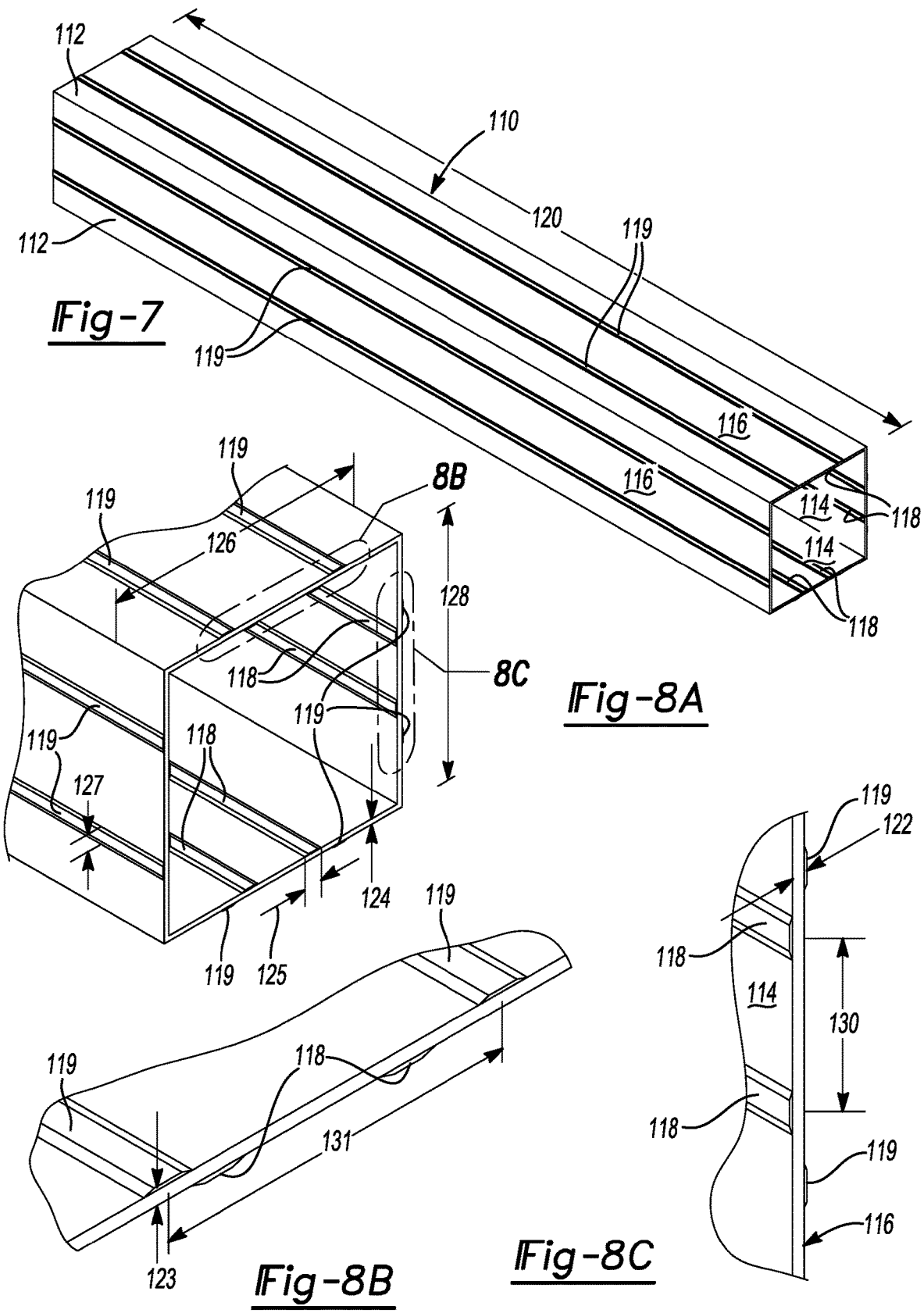

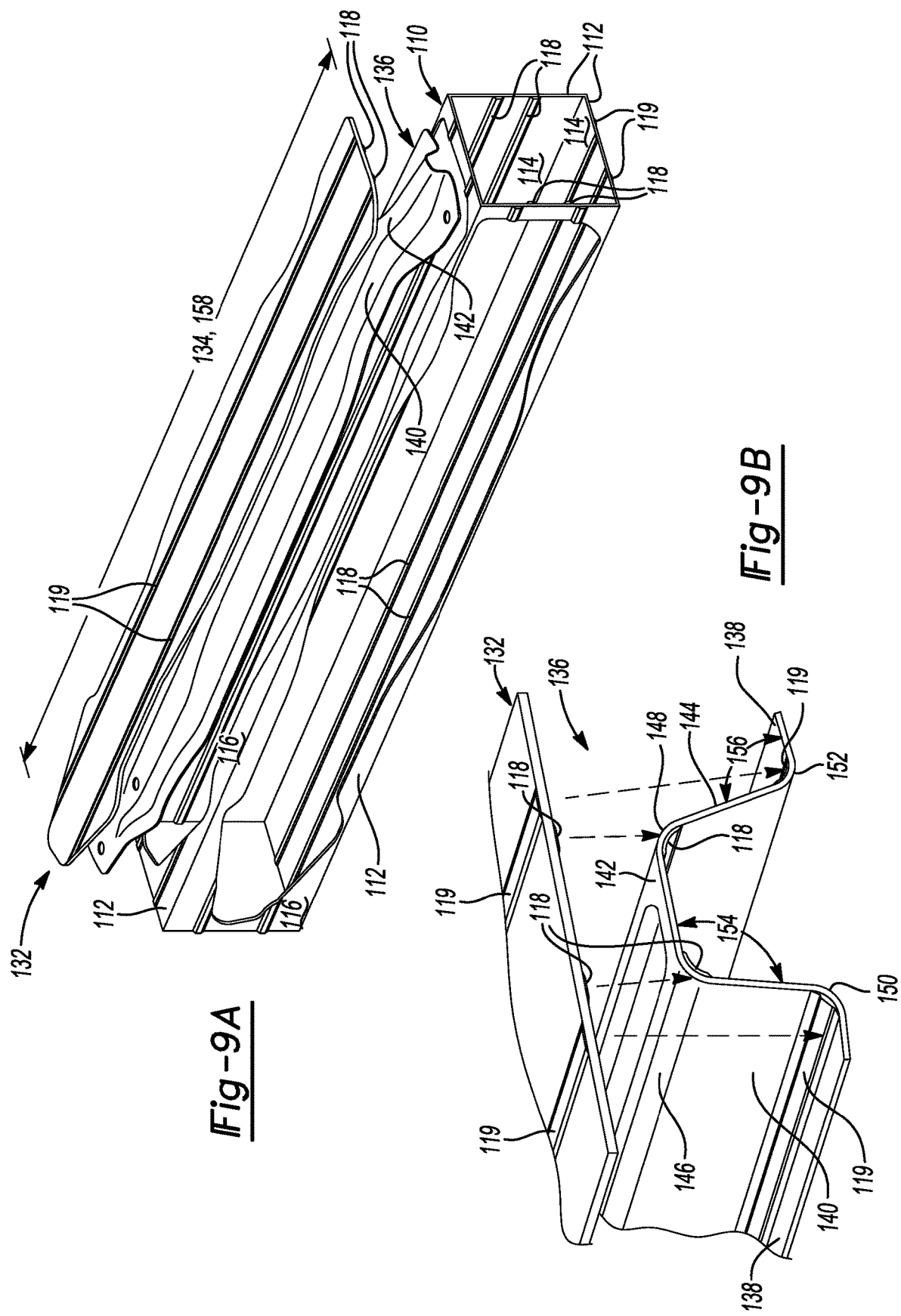

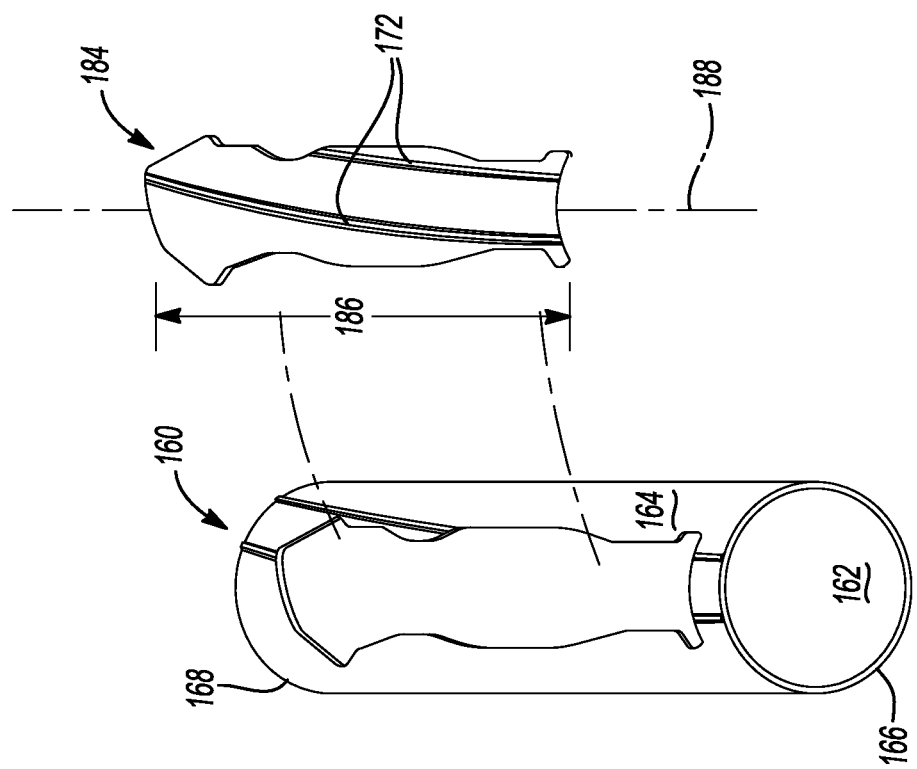
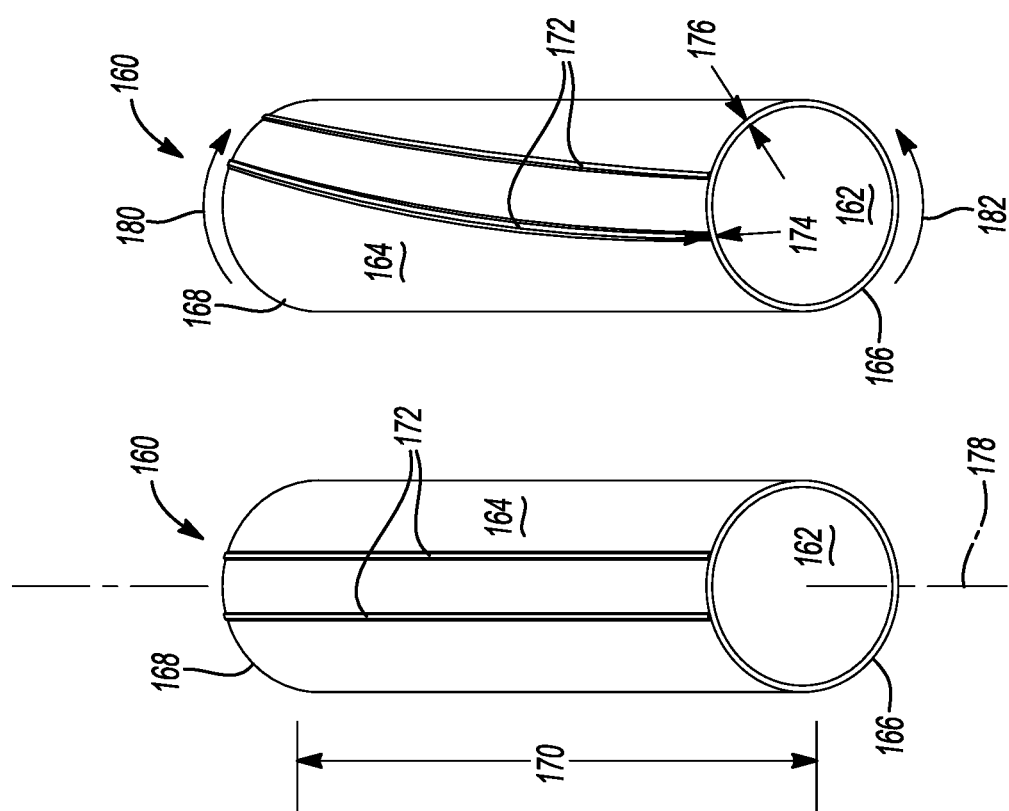

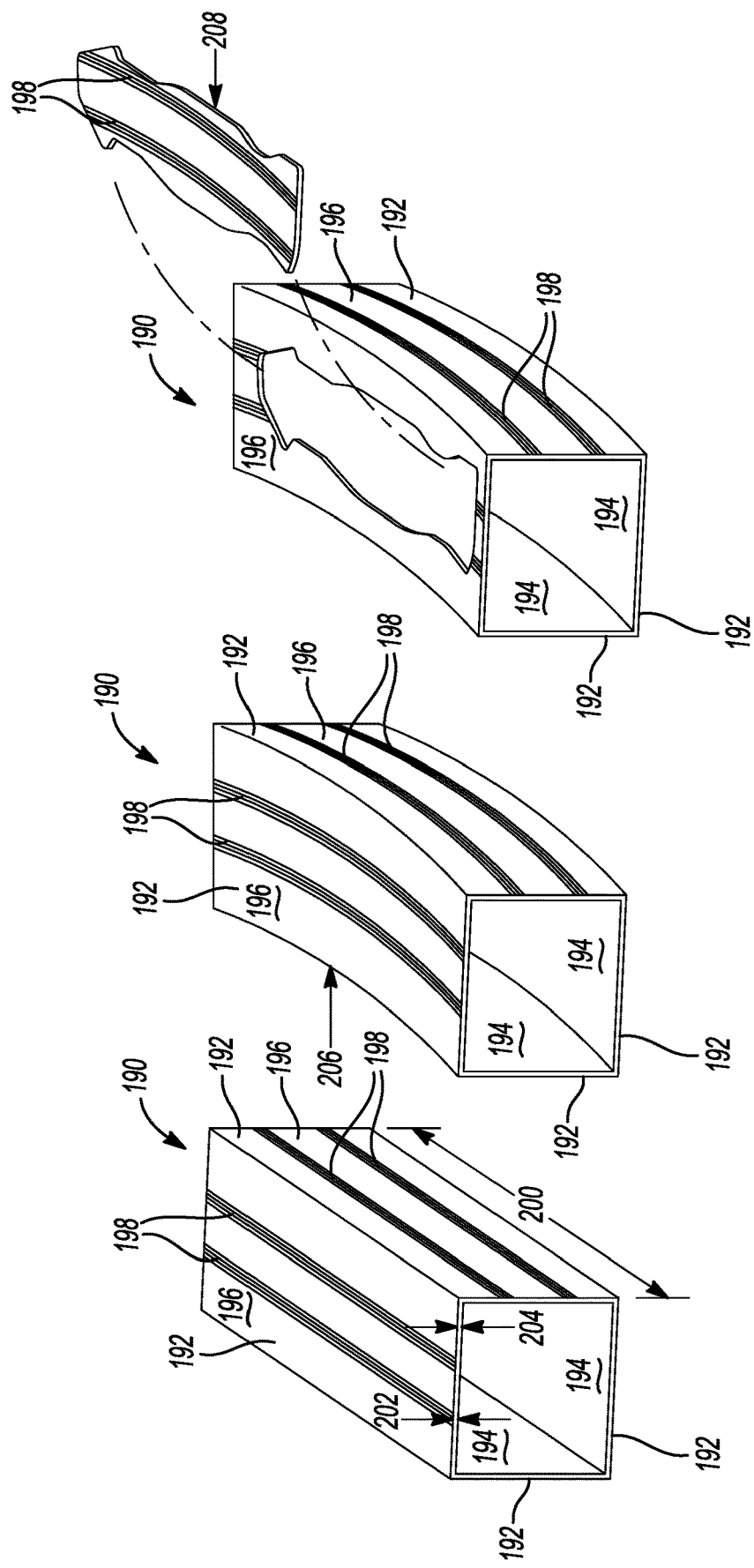

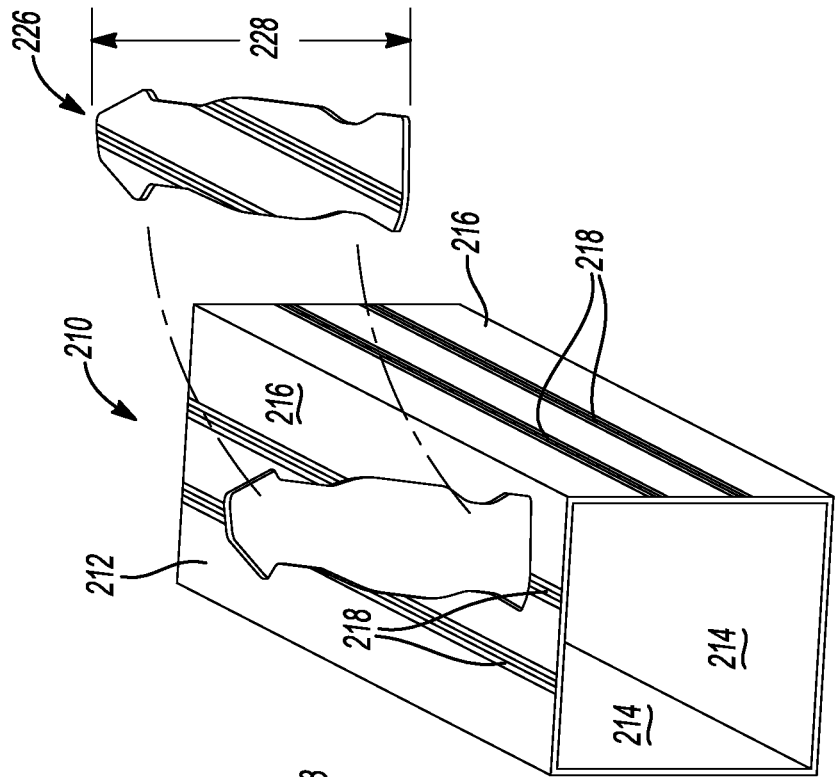
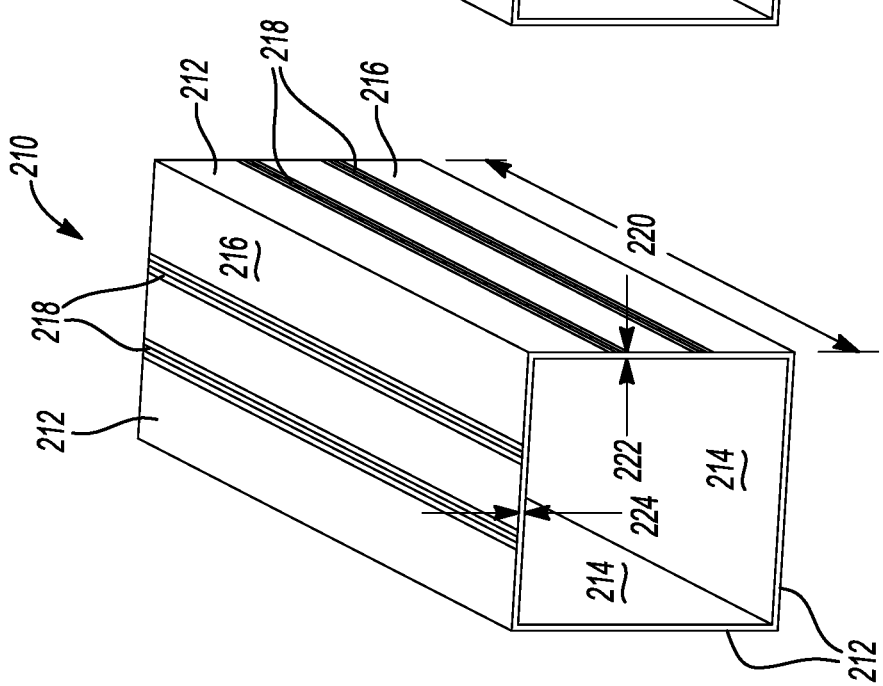
Fig-12B
Fig-12A

METHOD OF MANUFACTURING VEHICLE BODY STRUCTURE COMPONENT TO INCLUDE REINFORCED REGIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of manufacturing a vehicle body structure component to include reinforced regions.

Extrusion is a process in which a material is pushed through a die to yield a extruded product having a desired cross section. The material is typically a metal such as aluminum or steel. Extruded products are used in a variety of industries to produce components such as railroad tracks, vehicle frames, rails, and pipe fittings.

SUMMARY

The present disclosure describes a method of manufacturing a vehicle body structure component. In one example, the method includes extruding a tube to include at least one reinforced region extending along a length of the tube. The tube has a first thickness in the at least one reinforced region and a second thickness in other regions of the tube. The first thickness is greater than the second thickness. The method further includes cutting a blank from the tube such that the blank includes at least a portion of the at least one reinforced region and forming the blank into a desired shape of the component.

In one aspect, the tube is a rectangular tube having four sides, and the method further includes extruding the tube to include the at least one reinforced region on each side of the tube.

In one aspect, the at least one reinforced region includes a pair of reinforced regions protruding from an outer surface of the tube.

In one aspect, the at least one reinforced region includes a pair of reinforced regions protruding from an inner surface of the tube.

In one aspect, the at least one reinforced region includes a pair of first reinforced regions protruding from an outer surface of the tube and a pair of second reinforced regions protruding from an inner surface of the tube.

In one aspect, the first reinforced regions are spaced apart from one another by a first distance and the second reinforced regions are spaced apart from one another by a second distance that is less than the first distance.

In one aspect, the component includes a first flat section, a second flat section oriented at a nonzero angle relative to the first flat section, and a curved section joining the first and second flat sections to one another, and the method further includes positioning the at least one reinforced region on the tube such that at least one reinforced region resides in the curved section when the blank is formed into the desired shape of the component.

In one aspect, the first flat section, the second flat section, and the curved section extend along a length of the component.

In one aspect, the tube is a cylindrical tube, and the method further includes twisting the tube before cutting the blank from the tube such that the at least one reinforced region is misaligned with a length of the blank.

In one aspect, the tube is a rectangular tube, and the method further includes bending the tube before cutting the blank from the tube such that the at least one reinforced region is nonlinear.

In one aspect, the method further includes cutting the blank from the tube such that the at least one reinforced region is misaligned with a length of the blank.

In another example of a method of manufacturing a vehicle body structure component described in the present disclosure, the method includes extruding a rectangular tube to include at least one pair of reinforced regions on each side of the tube. The at least one pair of reinforced regions extend along a length of the tube. The tube has a first thickness in the reinforced regions and a second thickness in other regions of the tube. The first thickness is greater than the second thickness. The method further includes cutting a blank from the tube from each side of the tube such that the blank includes at least a portion of the at least one pair of reinforced regions, and forming the blank into a desired shape of the component having a u-shaped cross section with flanges projecting from ends of the u-shaped cross section.

In one aspect, the component includes a first flat section, a second flat section, a third flat section, a first curved section joining the first and second flat sections to one another, and a second curved section joining the second and third flat sections to one another. The first, second, and third flat sections and the first and second curved sections form the u-shaped cross section.

In one aspect, the method further includes positioning the at least one pair of reinforced regions on the tube such that the at least one pair of reinforced regions resides in the first and second curved sections of the component when the blank is formed into the desired shape of the component.

In one aspect, the component further includes a third curved section joining one of the flanges to the first flat section and a fourth curved section joining the other one of the flanges to the third flat section.

In one aspect, the method further includes positioning the at least one pair of reinforced regions on the tube such that the at least one pair of reinforced regions resides in the third and fourth curved sections of the component when the blank is formed into the desired shape of the component.

In one aspect, the at least one pair of reinforced regions includes a first pair of reinforced regions protruding from an outer surface of the tube and a second pair of reinforced regions protruding from an inner surface of the tube, and the method further includes positioning the first and second pairs of reinforced regions on the tube such that, when the blank is formed into the desired shape of the component, the first pair of reinforced regions reside in the first and second curved sections of the component and the second pair of reinforced regions reside in the third and fourth curved sections of the component.

In one aspect, the second thickness of the tube on one side thereof is different than the second thickness of the tube on another side thereof.

In one aspect, the method further includes placing the at least one pair of reinforced regions in one way on one side of the tube and placing the at least one pair of reinforced regions in a different way on another side of the tube.

In one aspect, the method further includes extruding the tube such that the tube has a width and a height that is different than its width.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a first example of an extruded tube according to the principles of the present disclosure;

FIG. 2A is a perspective view of an end of the extruded tube of FIG. 1;

FIG. 2B is a perspective view of a portion of the extruded tube of FIG. 1 within a circle 2B shown in FIG. 2A;

FIG. 3A is a perspective view of the extruded tube of FIG. 1 with blanks cut from sides of the extruded tube and one blank formed into a door beam;

FIG. 3B is a sectioned perspective view of the blank and door beam shown in FIG. 3A;

FIG. 6A is a perspective view of the extruded tube of FIG. 4 with blanks cut from sides of the extruded tube and one blank formed into a door beam;

FIG. 6B is a sectioned perspective view of the blank and door beam shown in FIG. 6A;

FIG. 7 is a perspective view of a third example of an extruded tube according to the principles of the present disclosure;

FIG. 8A is a perspective view of an end of the extruded tube of FIG. 7;

FIG. 8B is a perspective view of a portion of the extruded tube of FIG. 7 within a circle 8B shown in FIG. 8A;

FIG. 8C is a perspective view of a portion of the extruded tube of FIG. 7 within a circle 8C shown in FIG. 8A;

FIG. 9A is a perspective view of the extruded tube of FIG. 7 with blanks cut from sides of the extruded tube and one blank formed into a door beam;

FIG. 9B is a sectioned perspective view of the blank and door beam shown in FIG. 9A;

FIG. 10A is a perspective view of a fourth example of an extruded tube according to the principles of the present disclosure;

FIG. 10B is a perspective view of the extruded tube of FIG. 10A after the extruded tube has been twisted about its central longitudinal axis;

FIG. 10O is a perspective view of the extruded tube of FIG. 10A with a blank cut from the extruded tube;

FIG. 11A is a perspective view of an extruded tube that is similar or identical to the extruded tube of FIG. 1;

FIG. 11B is a perspective view of the extruded tube of FIG. 11A after the extruded tube has been bent about a midpoint of its length;

FIG. 11C is a perspective view of the extruded tube of FIG. 11A with a blank cut from the extruded tube;

FIG. 12A is a perspective view of an extruded tube that is similar or identical to the extruded tube of FIG. 1; and FIG. 12B a perspective view of the extruded tube of FIG. 11A with a blank cut from the extruded tube.

In the drawings, reference numbers may be reused to identify similar and/or identical elements.

DETAILED DESCRIPTION

Figure 4:
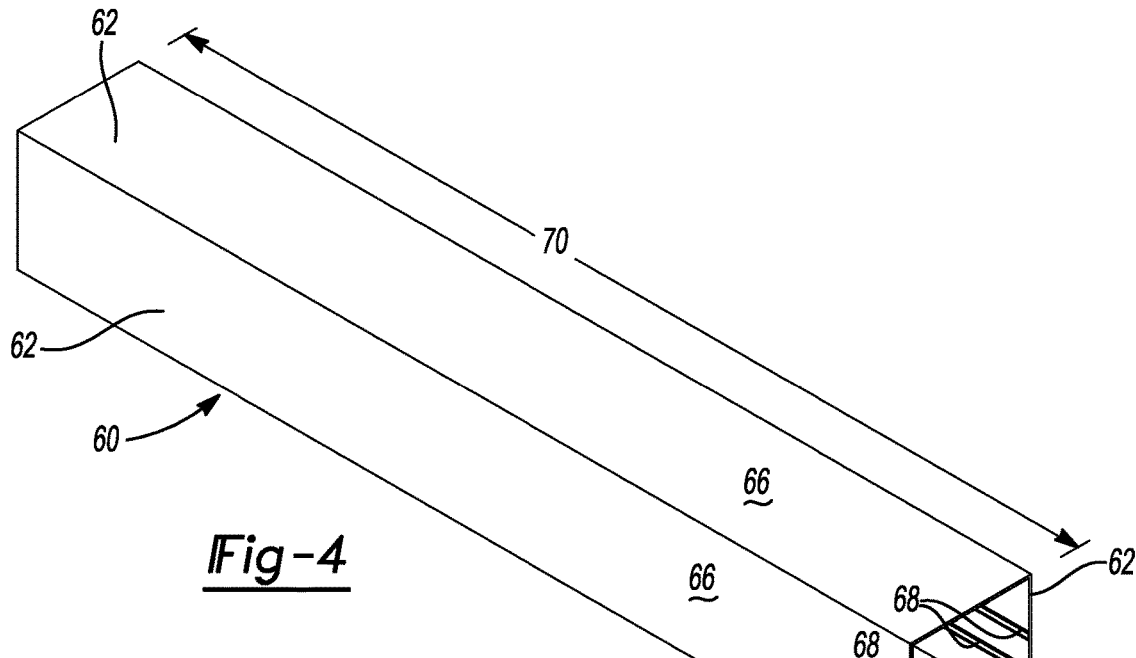
FIG. 4 is a perspective view of a second example of an extruded tube according to the principles of the present disclosure.

Many vehicle body structure components are extruded. Examples of such components include a vehicle door beam, a cross car reinforcement, a rocker section, a complete rocker, a frame rail, a bumper beam, and a bumper beam reinforcement. Typically, the extrusion produces a square or cylindrical tube having a cross section with a constant thickness, and blanks are cut from the tube and formed (e.g., stamped, rolled) into a desired shape of a vehicle body structure component.

Sometimes, the cross section of the vehicle body structure component is hat-shaped with straight sides and bends that join the straight sides to one another. During a vehicle impact, high stress regions of the vehicle body structure component tend to be at the bends. To ensure that these regions can withstand a vehicle impact, the entire cross section of the extruded tube is thickened. As a result, other regions tend to be thicker than necessary, which increases part cost and weight.

A method of manufacturing a vehicle body structure component according to the present disclosure involves extruding a structure (e.g., a tube) to have a cross-sectional shape with reinforced regions that are thicker than other regions of the structure (e.g., the remainder of the structure). Such a cross-sectional shape may be referred to as having a variable cross-sectional thickness. In addition, the method involves positioning the reinforced regions on the structure so that, when a blank is cut from the structure and formed into the desired shape of the vehicle body structure component, the reinforced regions reside in high stress areas. In turn, the other regions of the structure can be thinner than the reinforced regions, which reduces the part cost and weight while maintaining the structural integrity of the component.

In the examples below, a method of manufacturing a vehicle body structure component according to the present disclosure is described in the context of a vehicle door beam having a hat shaped cross section. However, the techniques described herein may be used to manufacture other vehicle body structure components, such as a cross car reinforcement, a rocker section, a complete rocker, a frame rail, a bumper beam, and a bumper beam reinforcement. In addition, the techniques described herein may be used to manufacture extruded parts having other cross section shapes and/or parts used in other industries, such as the aircraft and building industries, the marine, naval, or ship building industry, and the heavy machinery and pressurized container manufacturing industries.

Referring now to FIGS. 1, 2A, and 2B, a rectangular tube 10 has four sides 12. Each side 12 of the tube 10 has an inner surface 14 and an outer surface 16. The tube 10 includes a pair of reinforced regions 18 that protrude from the outer surface 16 of each side 12 and extend along a length 20 of the tube 10. The tube 10 has a thickness 22 in the reinforced regions 18 and a thickness 24 in other regions of the tube 10 (e.g., the remainder of the tube 10).

The thickness 22 of the tube 10 in the reinforced regions 18 is greater than the thickness 24 of the tube 10 in the other regions. In one example, the thickness 22 of the tube 10 in the reinforced regions 18 is equal to 3 millimeters (mm), and the thickness 24 of the tube 10 in the other regions is equal to 2.5 mm. Thus, in this example, the reinforced regions 18 of the tube 10 are 0.5 mm thicker than the other regions of the tube 10. Each reinforced region 18 has a width 25 (e.g., 6 mm). The thickness 22 of the tube 10 in the reinforced regions 18, the thickness 24 of the tube 10 in the other regions, and/or the width 25 of one reinforced region 18 on one side 12 of the tube 10 may be equal to or different than the thickness 22, the thickness 24, and/or the width 25, respectively, on another side 12 of the tube 10.

Two sides 12 of the tube 10 define a width 26 thereof, and the other two sides 12 of the tube 10 define a height 28 thereof. The width 26 of the tube 10 may be equal to or different than the height 28 of the tube 10. Thus, the dimensions of the sides 12 that define the width 26 of the tube 10 may be equal to or different than the dimensions of the sides 12 that define the height 28 of the tube 10. In one example, the width 26 of the tube 10 is 150 mm, and the height 28 of the tube 10 is 150 mm.

The longitudinal centerlines of the reinforced regions 18 on each side 12 of the tube 10 are spaced apart by a distance 30. The distance 30 by which the longitudinal centerlines of the reinforced regions 18 are spaced apart on one side 12 of the tube 10 may be equal to or different than the distance 30 by which the longitudinal centerlines of the reinforced regions 18 are spaced apart on another side 12 of the tube 10. In one example, the distance 30 by which the longitudinal centerlines of the reinforced regions 18 are spaced apart is equal to 70 mm on each side 12 of the tube 10.

The tube 10 can be formed from metal using extrusion. The reinforced regions 18 of the tube 10 can be formed together with the remainder of the tube 10 as a unitary body. For example, the reinforced regions 18 of the tube 10 can be formed integral with the remainder of the tube 10 in a single extrusion operation.

Referring now to FIGS. 3A and 3B, a blank 32 may be cut from each side 12 of the tube 10 so that the blank 32 includes at least a portion of each reinforced region 18. In the example shown, each blank 32 includes the majority of the reinforced regions 18 from one side 12 of the tube 10. In addition, each blank 32 is cut so that the reinforced regions 18 are aligned with a length 34 of the blank 32. Each blank 32 may be cut from one side 12 of the tube 10 using milling, electric discharge machining, laser cutting, or waterjet cutting. The remainder of the tube 10 may be recycled.

Each blank 32 may be formed into a desired shape of a vehicle door beam 36 using room temperature stamping, hot stamping, or roll forming. The door beam 36 has a hat-shaped cross section or a u-shaped cross section with flanges 38 projecting from the ends of the u-shaped cross section. The door beam 36 includes a flat section 40, a flat section 42, a flat section 44, a curved section 46 joining the flat sections 40, 42 to one another, and a curved section 48 joining the flat sections 42, 44 to one another. The flat sections 40, 42, 44 and the curved sections 46, 48 form the u-shaped cross section of the door beam 36. In various implementations, a stiffening rib may be formed along the longitudinal centerline of the flat section 42, and the stiffening rib may be recessed relative to the remainder of the flat section 42.

The door beam 36 further includes a curved section 50 joining one of the flanges 38 to the flat section 40 and a curved section 52 joining the other flange 38 to the flat section 44. As best shown in FIG. 3B, the reinforced regions 18 are positioned on the tube 10 such that the reinforced regions 18 reside in the curved sections 50, 52 of the door beam 36 when the blank 32 is formed into the desired shape of the door beam 36. As a result, the thickness 24 of the tube 10 in the other regions may be less than the thickness 22 of the tube 10 in the reinforced regions 18 as shown in FIG. 2B while maintaining the structural integrity of the door beam 36.

Each flat section 40, 44 of the door beam 36 is oriented at a nonzero angle 54 relative to the flat section 42 of the door beam 36. Each flange 38 of the door beam 36 is oriented at a nonzero angle 56 relative to the flat section 40 or 44. In the example shown, each nonzero angle 54, 56 is an obtuse angle. The flat sections 40, 42, 44 and the curved sections 46, 48, 50, 52 extend along a length 58 of the door beam 36. Each flat section and curved section described herein may be referred to as a straight side and a bend, respectively.

Figure 5A:
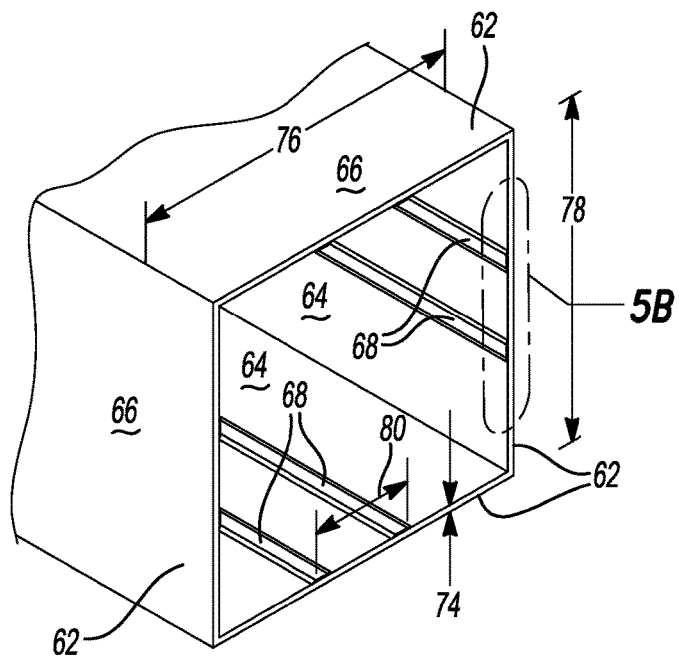
FIG. 5A is a perspective view of an end of the extruded tube of FIG. 4.
Figure 5B:
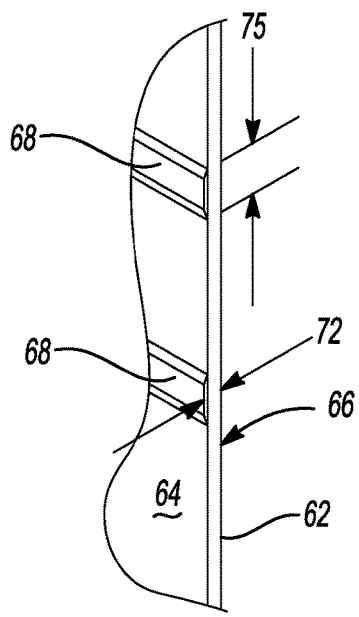
FIG. 5B is a perspective view of a portion of the extruded tube of FIG. 4 within a circle 5B shown in FIG. 5A.

Referring now to FIGS. 4, 5A, and 5B, a rectangular tube 60 has four sides 62. Each side 62 of the tube 60 has an inner surface 64 and an outer surface 66. The tube 60 includes a pair of reinforced regions 68 that protrude from the inner surface 64 of each side 62 and extend along a length 70 of the tube 60. The tube 60 has a thickness 72 in the reinforced regions 68 and a thickness 74 in other regions of the tube 60 (e.g., the remainder of the tube 60). The longitudinal edges of the reinforced regions 68 may be tapered as shown, and the angle of each taper can be adjusted (e.g., different than shown).

The thickness 72 of the tube 60 in the reinforced regions 68 is greater than the thickness 74 of the tube 60 in the other regions. In one example, the thickness 72 of the tube 60 in the reinforced regions 68 is equal to 3 mm, and the thickness 74 of the tube 60 in the other regions is equal to 2.5 mm. Thus, in this example, the reinforced regions 68 of the tube 60 are 0.5 mm thicker than the other regions of the tube 60. Each reinforced region 68 has a width 75 (e.g., 6 mm). The thickness 72 of the tube 60 in the reinforced regions 68, the thickness 74 of the tube 60 in the other regions, and/or the width 75 of one reinforced region 68 on one side 62 of the tube 60 may be equal to or different than the thickness 72, the thickness 74, and/or the width 75, respectively, on another side 62 of the tube 60.

Two sides 62 of the tube 60 define a width 76 thereof, and the other two sides 62 of the tube 60 define a height 78 thereof. The width 76 of the tube 60 may be equal to or different than the height 78 of the tube 60. Thus, the dimensions of the sides 62 that define the width 76 of the tube 60 may be equal to or different than the dimensions of the sides 62 that define the height 78 of the tube 60. In one example, the width 76 of the tube 60 is 150 mm, and the height 78 of the tube 60 is 150 mm.

The longitudinal centerlines of the reinforced regions 68 on each side 62 of the tube 60 are spaced apart by a distance 80. The distance 80 by which the longitudinal centerlines of the reinforced regions 68 are spaced apart on one side 62 of the tube 60 may be equal to or different than the distance 80 by which the longitudinal centerlines of the reinforced regions 68 are spaced apart on another side 62 of the tube 60. In one example, the distance 80 by which the longitudinal centerlines of the reinforced regions 68 are spaced apart is equal to 38.5 mm on each side 62 of the tube 60.

The tube 60 can be formed from metal using extrusion. The reinforced regions 68 of the tube 60 can be formed together with the remainder of the tube 60 as a unitary body. For example, the reinforced regions 68 of the tube 60 can be formed integral with the remainder of the tube 60 in a single extrusion operation.

Referring now to FIGS. 6A and 6B, a blank 82 may be cut from each side 62 of the tube 60 so that the blank 82 includes at least a portion of each reinforced region 68. In the example shown, each blank 82 includes the majority of the reinforced regions 68 from one side 62 of the tube 60. In addition, each blank 82 is cut so that the reinforced regions 68 are aligned with a length 84 of the blank 82. Each blank 82 may be cut from one side 62 of the tube 60 using milling, electric discharge machining, laser cutting, or waterjet cutting. The remainder of the tube 60 may be recycled.

Each blank 82 may be formed into a desired shape of a vehicle door beam 86 using room temperature stamping, hot stamping, or roll forming. The door beam 86 has a hat-shaped cross section or a u-shaped cross section with flanges 88 projecting from the ends of the u-shaped cross section. The door beam 86 includes a flat section 90, a flat section 92, a flat section 94, a curved section 96 joining the flat sections 90, 92 to one another, and a curved section 98 joining the flat sections 92, 94 to one another. The flat sections 90, 92, 94 and the curved sections 96, 98 form the u-shaped cross section of the door beam 86. In various implementations, a stiffening rib may be formed along the longitudinal centerline of the flat section 92, and the stiffening rib may be recessed relative to the remainder of the flat section 92.

The door beam 86 further includes a curved section 100 joining one of the flanges 88 to the flat section 90 and a curved section 102 joining the other flange 88 to the flat section 94. As best shown in FIG. 6B, the reinforced regions 68 are positioned on the tube 60 such that the reinforced regions 68 reside in the curved sections 96, 98 of the door beam 86 when the blank 82 is formed into the desired shape of the door beam 86. As a result, the thickness 74 of the tube 60 in the other regions may be less than the thickness 72 of the tube 60 in the reinforced regions 68 as shown in FIGS. 5A and 5B while maintaining the structural integrity of the door beam 86.

Each flat section 90, 94 of the door beam 86 is oriented at a nonzero angle 104 relative to the flat section 92 of the door beam 86. Each flange 88 of the door beam 86 is oriented at a nonzero angle 106 relative to the flat section 90 or 94. In the example shown, each nonzero angle 104, 106 is an obtuse angle. The flat sections 90, 92, 94 and the curved sections 96, 98, 100, 102 extend along a length 108 of the door beam 86.

Referring now to FIGS. 7, 8A, 8B, and 8C, a rectangular tube 110 has four sides 112. Each side 112 of the tube 110 has an inner surface 114 and an outer surface 116. The tube 110 includes a pair of reinforced regions 118 that protrude from the inner surface 114 of each side 112 and a pair of reinforced regions 119 that protrude from the outer surface 116 of each side 112. The reinforced regions 118, 119 extend along a length 120 of the tube 110. The tube 110 has a thickness 122 in the reinforced regions 118, a thickness 123 in the reinforced regions 119, and a thickness 124 in other regions of the tube 110 (e.g., the remainder of the tube 110).

The thicknesses 122, 123 of the tube 110 in the reinforced regions 118, 119 is greater than the thickness 124 of the tube 110 in the other regions. In one example, each thickness 122, 123 of the tube 110 in the reinforced regions 118, 119 is equal to 3 mm, and the thickness 124 of the tube 110 in the other regions is equal to 2.5 mm. Thus, in this example, the reinforced regions 118, 119 of the tube 110 are 0.5 mm thicker than the other regions of the tube 110. Each reinforced region 118 has a width 125 (e.g., 6 mm), and each reinforced region 119 has a width 127 (e.g., 6 mm). The thicknesses 122, 123 of the tube 110 in the reinforced regions 118, 119, the thickness 124 of the tube 110 in the other regions, and/or the widths 125, 127 of the reinforced regions 118, 119 on one side 112 of the tube 110 may be equal to or different than the thicknesses 122, 123, the thickness 124, and/or the widths 125, 127, respectively, on another side 112 of the tube 110.

Two sides 112 of the tube 110 define a width 126 thereof, and the other two sides 112 of the tube 110 define a height 128 thereof. The width 126 of the tube 110 may be equal to or different than the height 128 of the tube 110. Thus, the dimensions of the sides 112 that define the width 126 of the tube 110 may be equal to or different than the dimensions of the sides 112 that define the height 128 of the tube 110. In one example, the width 126 of the tube 110 is 150 mm, and the height 128 of the tube 110 is 150 mm.

The longitudinal centerlines of the reinforced regions 118 on each side 112 of the tube 110 are spaced apart by a distance 130, and the longitudinal centerlines of the reinforced regions 119 on each side 112 of the tube 110 are spaced apart by a distance 131. The distances 130, 131 by which the longitudinal centerlines of the reinforced regions 118, 119 are spaced apart on one side 112 of the tube 110 may be equal to or different than the distances 130, 131 by which the longitudinal centerlines of the reinforced regions 118, 119 are spaced apart on another side 112 of the tube 110. In one example, the distance 130 by which the longitudinal centerlines of the reinforced regions 118 are spaced apart is equal to 38.5 mm on each side 112 of the tube 110, and the distance 131 by which the longitudinal centerlines of the reinforced regions 119 are spaced apart is equal to 70 mm on each side 112 of the tube 110.

The tube 110 can be formed from metal using extrusion. The reinforced regions 118, 119 of the tube 110 can be formed together with the remainder of the tube 110 as a unitary body. For example, the reinforced regions 118, 119 of the tube 110 can be formed integral with the remainder of the tube 110 in a single extrusion operation.

Referring now to FIGS. 9A and 9B, a blank 132 may be cut from each side 112 of the tube 110 so that the blank 132 includes at least a portion of each reinforced region 118, 119. In the example shown, each blank 132 includes the majority of the reinforced regions 118, 119 from one side 112 of the tube 110. In addition, each blank 132 is cut so that the reinforced regions 118, 119 are aligned with a length 134 of the blank 132. Each blank 132 may be cut from one side 112 of the tube 110 using milling, electric discharge machining, laser cutting, or waterjet cutting. The remainder of the tube 110 may be recycled.

Each blank 132 may be formed into a desired shape of a vehicle door beam 136 using room temperature stamping, hot stamping, or roll forming. The door beam 136 has a hat-shaped cross section or a u-shaped cross section with flanges 138 projecting from the ends of the u-shaped cross section. The door beam 136 includes a flat section 140, a flat section 142, a flat section 144, a curved section 146 joining the flat sections 140, 142 to one another, and a curved section 148 joining the flat sections 142, 144 to one another. The flat sections 140, 142, 144 and the curved sections 146, 148 form the u-shaped cross section of the door beam 136. In various implementations, a stiffening rib may be formed along the longitudinal centerline of the flat section 142, and the stiffening rib may be recessed relative to the remainder of the flat section 142.

The door beam 136 further includes a curved section 150 joining one of the flanges 138 to the flat section 140 and a curved section 152 joining the other flange 138 to the flat section 144. As best shown in FIG. 9B, the reinforced regions 118, 119 are positioned on the tube 110 such that, when the blank 132 is formed into the desired shape of the door beam 136, the reinforced regions 118 and 119 reside in the curved sections 146, 148 and 150, 152, respectively, of the door beam 136. As a result, the thickness 124 of the tube 110 in the other regions may be less than the thicknesses 122, 123 of the tube 110 in the reinforced regions 118, 119 as shown in FIGS. 8B and 8C while maintaining the structural integrity of the door beam 136.

Each flat section 140, 144 of the door beam 136 is oriented at a nonzero angle 154 relative to the flat section 142 of the door beam 136. Each flange 138 of the door beam 136 is oriented at a nonzero angle 156 relative to the flat section 140 or 144. In the example shown, each nonzero angle 154, 156 is an obtuse angle. The flat sections 140, 142, 144 and the curved sections 146, 148, 150, 152 extend along a length 158 of the door beam 136.

Referring now to FIGS. 10A, 10B, and 10O, a cylindrical tube 160 has an inner surface 162, an outer surface 164, a first end 166, a second end 168 opposite of the first end 166, and a length 170 extending from the first end 166 to the second end 168. The tube 160 includes a pair of reinforced regions 172 that protrude from the outer surface 164 of the tube 160 and extend along the length 170 of the tube 160. The tube 160 has a thickness 174 in the reinforced regions 172 and a thickness 176 in other regions of the tube 160 (e.g., the remainder of the tube 160). The thickness 174 of the tube 160 in the reinforced regions 172 is greater than the thickness 176 of the tube 160 in the other regions.

The tube 160 can be formed from metal using extrusion. The reinforced regions 172 of the tube 160 can be formed together with the remainder of the tube 160 as a unitary body. For example, the reinforced regions 172 of the tube 160 can be formed integral with the remainder of the tube 160 in a single extrusion operation.

FIG. 10A shows the tube 160 after the tube 160 has been extruded, with the reinforced regions 172 extending parallel to a central longitudinal axis 178 of the tube 160. In FIG. 10B, the tube 160 is twisted about its central longitudinal axis 178, and therefore the reinforced regions 172 no longer extend parallel to the central longitudinal axis 178. To twist the tube 160 about its central longitudinal axis 178, the second end 168 of the tube 160 may be twisted in the direction 180 while the first end 166 of the tube 160 is fixed in a constant position or twisted in a direction 182 opposite of the direction 180.

In FIG. 10O, a blank 184 is cut from the tube 160 so that the blank 184 includes at least a portion of each reinforced region 170. In addition, the blank 184 is cut so that, prior to its removal, a length 186 of the blank 184 extends parallel to the length 169 of the tube 160, and a longitudinal centerline 188 of the blank 184 is parallel to the central longitudinal axis 178 of the tube 160. Since the tube 160 is twisted about its central longitudinal axis 178 before the bank 184 is cut, each reinforced region 170 is misaligned with (e.g., not parallel to) the length 186 of the blank 184 and misaligned with the longitudinal centerline 188 of the blank 184.

The blank 184 may be cut from the tube 160 using milling, electric discharge machining, laser cutting, or waterjet cutting. The blank 184 may be formed into a desired shape of a body structure component, such as a vehicle door beam, using room temperature stamping, hot stamping, or roll forming. The tube 160 may be twisted about its central longitudinal axis 178 before the blank 184 is cut so that, when the blank 184 is formed into the body structure component, the reinforced regions 172 extend along a high-stress region of the component. As a result, the thickness 176 of the tube 160 in the other regions may be less than the thickness 174 of the tube 160 in the reinforced regions 172 while maintaining the structural integrity of the body structure component.

Referring now to FIGS. 11A, 11B, and 110, a rectangular tube 190 has four sides 192. Each side 192 of the tube 190 has an inner surface 194 and an outer surface 196. The tube 190 includes a pair of reinforced regions 198 that protrude from the outer surface 196 of each side 192 and extend along a length 200 of the tube 190. The tube 190 has a thickness 202 in the reinforced regions 198 and a thickness 204 in other regions of the tube 190 (e.g., the remainder of the tube 190). The thickness 202 of the tube 190 in the reinforced regions 198 is greater than the thickness 204 of the tube 190 in the other regions.

The tube 190 can be formed from metal using extrusion. The reinforced regions 198 of the tube 190 can be formed together with the remainder of the tube 160 as a unitary body. For example, the reinforced regions 198 of the tube 160 can be formed integral with the remainder of the tube 160 in a single extrusion operation.

FIG. 11A shows the tube 190 after the tube 190 has been extruded, with the reinforced regions 198 extending in a straight line parallel to the length 200 of the tube 190. In FIG. 11B, the tube 190 is bent about a plane located midway along the length 200 of the tube 190, and therefore the reinforced regions 198 are curved or nonlinear (e.g., no longer extend in a straight line). The tube 190 may be bent around a mandrel (not shown) by pressing a ram (not shown) against the tube 190 in a direction 206 while hold both ends of the tube 190. In various implementations, the tube 190 may be bent about a plane at a location other than midway along the length 200 of the tube 190. Additionally or alternatively, multiple bends may be made in the tube 190 to, for example, form the tube 190 into an S-shape.

In FIG. 11C, a blank 208 is cut from the tube 190 so that the blank 208 includes at least a portion of each reinforced region 198. The blank 208 may be cut from the tube 190 using milling, electric discharge machining, laser cutting, or waterjet cutting. The blank 208 may be formed into a desired shape of a body structure component, such as a vehicle door beam, using room temperature stamping, hot stamping, or roll forming. The tube 190 may be bent before the blank 208 is cut so that, when the blank 208 is formed into the body structure component, the reinforced regions 198 extend along a high-stress region of the component. As a result, the thickness 204 of the tube 190 in the other regions may be less than the thickness 202 of the tube 190 in the reinforced regions 198 while maintaining the structural integrity of the body structure component.

Referring now to FIGS. 12A and 12B, a rectangular tube 210 has four sides 212. Each side 212 of the tube 210 has an inner surface 214 and an outer surface 216. The tube 210 includes a pair of reinforced regions 218 that protrude from the outer surface 216 of each side 212 and extend along a length 220 of the tube 210. The tube 210 has a thickness 222 in the reinforced regions 218 and a thickness 224 in other regions of the tube 210 (e.g., the remainder of the tube 210). The thickness 222 of the tube 210 in the reinforced regions 218 is greater than the thickness 224 of the tube 210 in the other regions.

The tube 210 can be formed from metal using extrusion. The reinforced regions 218 of the tube 210 can be formed together with the remainder of the tube 160 as a unitary body. For example, the reinforced regions 218 of the tube 160 can be formed integral with the remainder of the tube 160 in a single extrusion operation.

FIG. 12A shows the tube 210 after the tube 210 has been extruded, with the reinforced regions 218 extending in parallel to the length 220 of the tube 210. In FIG. 12B, a blank 226 is cut from the tube 210 so that the blank 226 includes at least a portion of each reinforced region 218 and so that the reinforced regions 218 are misaligned with a length 228 of the blank 226. The blank 226 may be cut from the tube 210 using milling, electric discharge machining, laser cutting, or waterjet cutting. The blank 226 may be formed into a desired shape of a body structure component, such as a vehicle door beam, using room temperature stamping, hot stamping, or roll forming. The blank 226 may be cut to misalign the reinforced regions 218 relative to the length 220 of the tube 210 so that, when the blank 226 is formed into the body structure component, the reinforced regions 218 extend along a high-stress region of the component. As a result, the thickness 224 of the tube 210 in the other regions may be less than the thickness 222 of the tube 210 in the reinforced regions 218 while maintaining the structural integrity of the body structure component.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of manufacturing a vehicle body structure component, the method comprising:
   extruding a tube to include at least one reinforced region extending along a length of the tube, the tube having a first thickness in the at least one reinforced region and a second thickness in other regions of the tube, wherein the first thickness is greater than the second thickness;
   cutting a blank from a side of the tube such that the blank includes at least a portion of the at least one reinforced region; and
   forming the blank into a desired shape of the component, wherein one of:
      the tube is a cylindrical tube, the method further comprising twisting the tube before cutting the blank from the tube such that the at least one reinforced region is misaligned with a length of the blank; and
      the tube is a rectangular tube, the method further comprising bending the tube before cutting the blank from the tube such that the at least one reinforced region is nonlinear.

2. The method of claim 1 wherein the tube is a cylindrical tube, the method further comprising twisting the tube before cutting the blank from the tube such that the at least one reinforced region is misaligned with a length of the blank.

3. The method of claim 1 wherein the tube is a rectangular tube, the method further comprising bending the tube before cutting the blank from the tube such that the at least one reinforced region is nonlinear.

4. The method of claim 1 further comprising cutting the blank from the tube such that the at least one reinforced region is misaligned with a length of the blank.

5. The method of claim 1 wherein the component includes a first flat section, a second flat section oriented at a nonzero angle relative to the first flat section, and a curved section joining the first and second flat sections to one another, the method further comprising positioning the at least one reinforced region on the tube such that at least one reinforced region resides in the curved section when the blank is formed into the desired shape of the component.

6. The method of claim 5 wherein the first flat section, the second flat section, and the curved section extend along a length of the component.

7. The method of claim 1 wherein the tube is a rectangular tube having four sides, the method further comprising extruding the tube to include the at least one reinforced region on each side of the tube.

8. The method of claim 7 wherein the at least one reinforced region includes a pair of reinforced regions protruding from an outer surface of the tube.

9. The method of claim 7 wherein the at least one reinforced region includes a pair of reinforced regions protruding from an inner surface of the tube.

10. A method of manufacturing a vehicle body structure component, the method comprising:
- extruding a tube to include at least one reinforced region extending along a length of the tube, the tube having a first thickness in the at least one reinforced region and a second thickness in other regions of the tube, wherein the first thickness is greater than the second thickness;
- cutting a blank from the tube such that the blank includes at least a portion of the at least one reinforced region; and
- forming the blank into a desired shape of the component, wherein:
  - the tube is a rectangular tube having four sides, the method further comprising extruding the tube to include the at least one reinforced region on each side of the tube; and
  - the at least one reinforced region includes a pair of first reinforced regions protruding from an outer surface of the tube and a pair of second reinforced regions protruding from an inner surface of the tube.

11. The method of claim 10 wherein the first reinforced regions are spaced apart from one another by a first distance and the second reinforced regions are spaced apart from one another by a second distance that is less than the first distance.

12. A method of manufacturing a vehicle body structure component, the method comprising:
- extruding a rectangular tube to include at least one pair of reinforced regions on each side of the tube, the at least one pair of reinforced regions extending along a length of the tube, the tube having a first thickness in the reinforced regions and a second thickness in other regions of the tube, wherein the first thickness is greater than the second thickness;
- cutting a blank from each side of the tube such that the blank includes at least a portion of the at least one pair of reinforced regions; and
- forming the blank into a desired shape of the component having a u-shaped cross section with flanges projecting from ends of the u-shaped cross section.

13. The method of claim 12 wherein the second thickness of the tube on one side thereof is different than the second thickness of the tube on another side thereof.

14. The method of claim 12 further comprising placing the at least one pair of reinforced regions in one way on one side of the tube and placing the at least one pair of reinforced regions in a different way on another side of the tube.

15. The method of claim 12 further comprising extruding the tube such that the tube has a width and a height that s different than its width.

16. The method of claim 12 wherein the component includes a first flat section, a second flat section, a third flat section, a first curved section joining the first and second flat sections to one another, and a second curved section joining the second and third flat sections to one another, the first, second, and third flat sections and the first and second curved sections forming the u-shaped cross section.

17. The method of claim 16 further comprising positioning the at least one pair of reinforced regions on the tube such that the at least one pair of reinforced regions resides in the first and second curved sections of the component when the blank is formed into the desired shape of the component.

18. The method of claim 16 wherein the component further includes a third curved section joining one of the flanges to the first flat section and a fourth curved section joining the other one of the flanges to the third flat section.

19. The method of claim 18 further comprising positioning the at least one pair of reinforced regions on the tube such that the at least one pair of reinforced regions resides in the third and fourth curved sections of the component when the blank is formed into the desired shape of the component.

20. The method of claim 18 wherein the at least one pair of reinforced regions includes a first pair of reinforced regions protruding from an outer surface of the tube and a second pair of reinforced regions protruding from an inner surface of the tube, the method further comprising positioning the first and second pairs of reinforced regions on the tube such that, when the blank is formed into the desired shape of the component, the first pair of reinforced regions reside in the first and second curved sections of the component and the second pair of reinforced regions reside in the third and fourth curved sections of the component.

* * * * *